US012594737B2

(12) United States Patent
Mistry et al.

(10) Patent No.: US 12,594,737 B2
(45) Date of Patent: Apr. 7, 2026

(54) MULTI-PURPOSE SEALING MODULE FOR PLASTIC FILM BASED BAGS AND POUCHES MAKING MACHINE

(71) Applicant: Mamata Machinery Private Limited, Ahmedabad (IN)

(72) Inventors: Hemang Rameshchandra Mistry, Vejalpur (IN); Janak Keshavlal Pithava, Ghodasar (IN)

(73) Assignee: Mamata Machinery Private Limited, Ahmedabad (IN)

( * ) Notice: Subject to any disclaimer, the term of this patent is extended or adjusted under 35 U.S.C. 154(b) by 0 days.

(21) Appl. No.: 18/386,342

(22) Filed: Nov. 2, 2023

(65) Prior Publication Data

US 2024/0383221 A1 Nov. 21, 2024

(51) Int. Cl.

*B31B 70/64* (2017.01)
*B65B 51/14* (2006.01)
*B65B 51/30* (2006.01)
*B31B 170/00* (2017.01)

(52) U.S. Cl.

CPC ........ *B31B 70/642* (2017.08); *B31B 2170/00* (2017.08)

(58) Field of Classification Search

CPC ..... B31B 70/642; B31B 70/645; B65B 51/14; B65B 51/146; B65B 51/30
USPC .......................................................... 493/209
See application file for complete search history.

(56) References Cited

U.S. PATENT DOCUMENTS 6,234,947 B1 * 5/2001 Michalik .............. B65H 45/163 493/425
6,416,453 B1 * 7/2002 Simonetti ............... B31B 50/00 493/189
7,497,065 B2 * 3/2009 Schiebout ........... B29C 66/9161 493/189
10,266,288 B2 * 4/2019 Ichikawa .......... B29C 66/81422

* cited by examiner

*Primary Examiner* — Stephen F. Gerrity
*Assistant Examiner* — Patrick B Fry
(74) *Attorney, Agent, or Firm* — Amster, Rothstein & Ebenstein LLP

(57) ABSTRACT

Multi-purpose sealing module (20) for machine (10) to manufacture heat-sealed plastic film based bags comprises a servo motor driven common drive shaft (30) in keyed connection with eccentric cams (40*a*, 40*b*) and (50*a*, 50*b*) such that eccentricity is equal and in opposite directions. Crank arms (60*a*, 60*b*) are connected to the eccentric cams (40*a*, 40*b*) though bearings (80*a*, 80*b*) and through bearings (120*a*, 120*b*) to linear guide rods (100*a*, 100*b*). Linear guide rods (100*a*, 100*b*) are in rigid connection with upper seal beam (140). Crank arms (70*a*, 70*b*) are connected to the eccentric cams (50*a*, 50*b*) though bearings (90*a*, 90*b*) and through bearings (130*a*, 130*b*) to connecting rods (110*a*, 110*b*). Connecting rods (110*a*, 110*b*) are in rigid connection with lower seal beam (150). Movement of lower seal beam (150) is guided by linear guide rods (100*a*, 100*b*). Angular movement of common drive shaft (30) gives simultaneous linear movement in opposite directions to upper seal beam (140) and lower seal beam (150) controlling the gap between a sealing jaw connected to upper seal beam (140) and a sealing jaw connected to the lower seal beam (150). Seal time and seal pressure of sealing of plastic film based bags and pouches; and angular movement of the drive shaft (30) are controlled by a programmable controller.

6 Claims, 6 Drawing Sheets

MULTI-PURPOSE SEALING MODULE FOR PLASTIC FILM BASED BAGS AND POUCHES MAKING MACHINE

FIELD OF THE INVENTION

The current invention relates to high speed machines to manufacture heat-sealed plastic film based bags and pouches. The present invention more particularly relates to multi-purpose sealing modules for high speed machines for manufacturing heat-sealed plastic film based bags and pouches.

PRIOR ART AND THE PROBLEM TO BE SOLVED

Plastic converting and flexible packaging industries are mainly engaged with producing plastic bags and pouches that have light weight, good strength, durability, are cost-effective and environmentally friendly. Plastic bags and pouches are used for containing and transporting goods such as foods produce, powders, magazines, chemicals, waste, etc.

Conventionally, plastic bags and pouches are made by heat-sealing, where two heated sealing jaws are brought in close proximity or contact with the plastic films to be joined that may be multi-structured or even laminated and pressing them in a controlled manner for certain time period.

Depending on the sealing requirement, either both the sealing jaws have open-close movement or only one sealing jaw is moved and another sealing jaw remains fixed and act as seal base. Sealing jaw movement is conventionally achieved by pneumatic cylinder actuation; motorized ball screw movement; timing belt-pulley drive; or a variety of mechanical linkages.

Plastic material has poor thermal conductivity. Therefore, for sealing to take place between two inside layers of plastic films, energy has to flow from the outer layers in contact with the sealing jaws to the inner layers where sealing occurs. If the process is not carried out precisely, it deteriorates or damages the appearance of the pouch/bag in the sealing area, producing bad pouches/bags. Pouches/bags with clear seal finish and leak proof sealing are the industry's requirements.

U.S. Pat. No. 6,550,255 B1 discloses a method and apparatus for obtaining individual web sections from a web of sheet material. In the invention disclosed therein, pressure and possibly heat is applied by means of blocks to opposite faces of an end portion of each flattened bag length as it passes through a sealing station. The heater bars disclosed therein are mounted on lightly spring loaded mounting blocks. Deflection of springs does not remain consistent for a long period especially, after high speed use. As a result, the quality of the bags produced is compromised. Also, for different material of the sheet, mechanical adjustments have to be made to the apparatus.

US Patent Application No. 2022/0242080 A1 discloses a bag making machine and bag making method wherein a heat-generating head of a sealing device is reciprocated via a link member and thermally fuses the multi-layer film. Such mechanism having a link member reciprocating the sealing device requires mechanical adjustments to be made to the machine for different material of the film.

U.S. Pat. No. 4,753,629 discloses a thermoplastic film heat bonding apparatus wherein reciprocating motion of a heated seal bar is supported by a support member with a resilient coupling between the support member and the heated seal bar. The resilience of such couplings does not remain consistent for a long period especially, after high speed use. As a result, the quality of the bags produced is compromised. Also, for different material of the sheet, mechanical adjustments have to be made to the apparatus.

Hence, there is a need for a multi-purpose sealing module that has consistency in producing sealed pouches, where repeatability of the process can be achieved accurately and where maintaining control parameters such as seal temperature, seal pressure and seal time can be established precisely.

The present invention does not use any spring or resilient coupling and does not require any mechanical adjustments to the machine with change in the material of the plastic film or the rate at which plastic bags or pouches need to be produced and at the same time provides repeatability while eliminating initial wastage that conventionally accompanies trial and error before high speed manufacturing can be begun with every change. In other words, with the present invention, sealing pressure and time can easily be altered with no mechanical adjustment to the machine, thereby improving efficiency and repeatability.

OBJECTS OF THE INVENTION

An object of the present invention is to efficiently select critical sealing process parameters for heat-sealing a variety of plastic substrates and films.

Another object of the present invention is to permit low sealing temperature to manufacture plastic bags and pouches from heat sensitive film.

Further object of the present invention is to use controlled linear movement of the sealing jaws to control the sealing impact.

Yet another object of the present invention is to use high force generation capability for high sealing pressure requirement using the multi-purpose sealing module.

An additional object of the present invention is to efficiently manufacture heat-sealed plastic film based bags and pouches with repeatability.

SUMMARY OF THE INVENTION

The present invention discloses a multi-purpose sealing module for a machine to manufacture heat-sealed plastic film based bags and pouches. In the said module, a common drive shaft is driven by a servo motor. The common drive shaft has a keyways on it. An upper seal beam and a lower seal beam are parts of the said module and linearly move towards or away from each other in a controlled manner permitting desired and precise gaps in between sealing jaws mounted on each of the two seal beams. The plastic film is conventionally transported to the said gap for heat-sealing and after heat-sealing, transported further.

The upper seal beam is rigidly connected with linear guide rods at both the ends. Conventionally, at such connection, a spring or a resilient coupling is used; however, the present invention, instead, has a rigid connection thereat. The said linear guide rods pass through holes in the lower seal beam to guide movement of the lower seal beam.

The upper seal beam and the lower seal beam move linearly towards or away from each other. Such linear movement results from conversion of angular movement of the common drive shaft into the said linear movement using crank and crank arm arrangements at four places: two for the upper seal beam and two for the lower seal beam.

The servo motor driven common drive shaft has keyed connections with two eccentric cams for the upper seal beam and two eccentric cams for the lower seal beam. The eccentricity of the common drive shaft with the eccentric cams for the upper seal beam is equal to and in opposite direction from the eccentricity of the common drive shaft with the eccentric cams for the lower seal beam.

For each of the four eccentric cams, there is a crank arm. Thus, there are two crank arms for the eccentric cams for the upper seal beam and likewise, there are two crank arms for the eccentric cams for the lower seal beam. The connection of each crank arm with its eccentric cam is through a bearing. Thus, servo motor driven angular movement of the common drive shaft which is in keyed connection with the eccentric cams will be converted into linear movement of the crank arms. Selectively, the said angular movement of the common drive shaft can be less than 360 degree angular rotation or a full 360 degree rotation. It can be discerned that whatever the angular movement is selected, it will be in opposite direction for the eccentric cams for the upper seal beam and the eccentric cams for the lower seal beam.

The crank arms for the upper seal beam are connected to the linear guide rods through bearings and the crank arms for the lower seal beam are connected to connecting rods which are rigidly connected to the lower seal beam.

Therefore, angular movement of the common drive shaft gives simultaneous linear movement in opposite directions to the upper seal beam and the lower seal beam. The gap between the sealing jaw connected to the upper seal beam and the sealing jaw connected to the lower seal beam is thus controlled. Seal time and seal pressure of sealing of the plastic film based bags and pouches; and angular movement of the common drive shaft are controlled by a programmable controller. For different thicknesses of the plastic film or for different materials of the plastic film, suitable seal time, seal pressure, and angular movement of the common drive shaft data available to the machine operator can be selected using the controller.

It would be evident to a person skilled in the art that the present invention is applicable equally to a machine wherein the plastic film is transported vertically as opposed to horizontally. In other words, the same inventive concept disclosed herein can be used in a machine to manufacture plastic film based bags and pouches when the plastic film is fed vertically. In such machines, instead of upper and lower beams, front and rear beams would be used while retaining the concept of converting angular movement of a common drive shaft into linear movement using crank and crank arm arrangements at four places: two for the front seal beam and two for the rear seal beam.

DETAILED DESCRIPTION OF THE INVENTION

Figure 1:
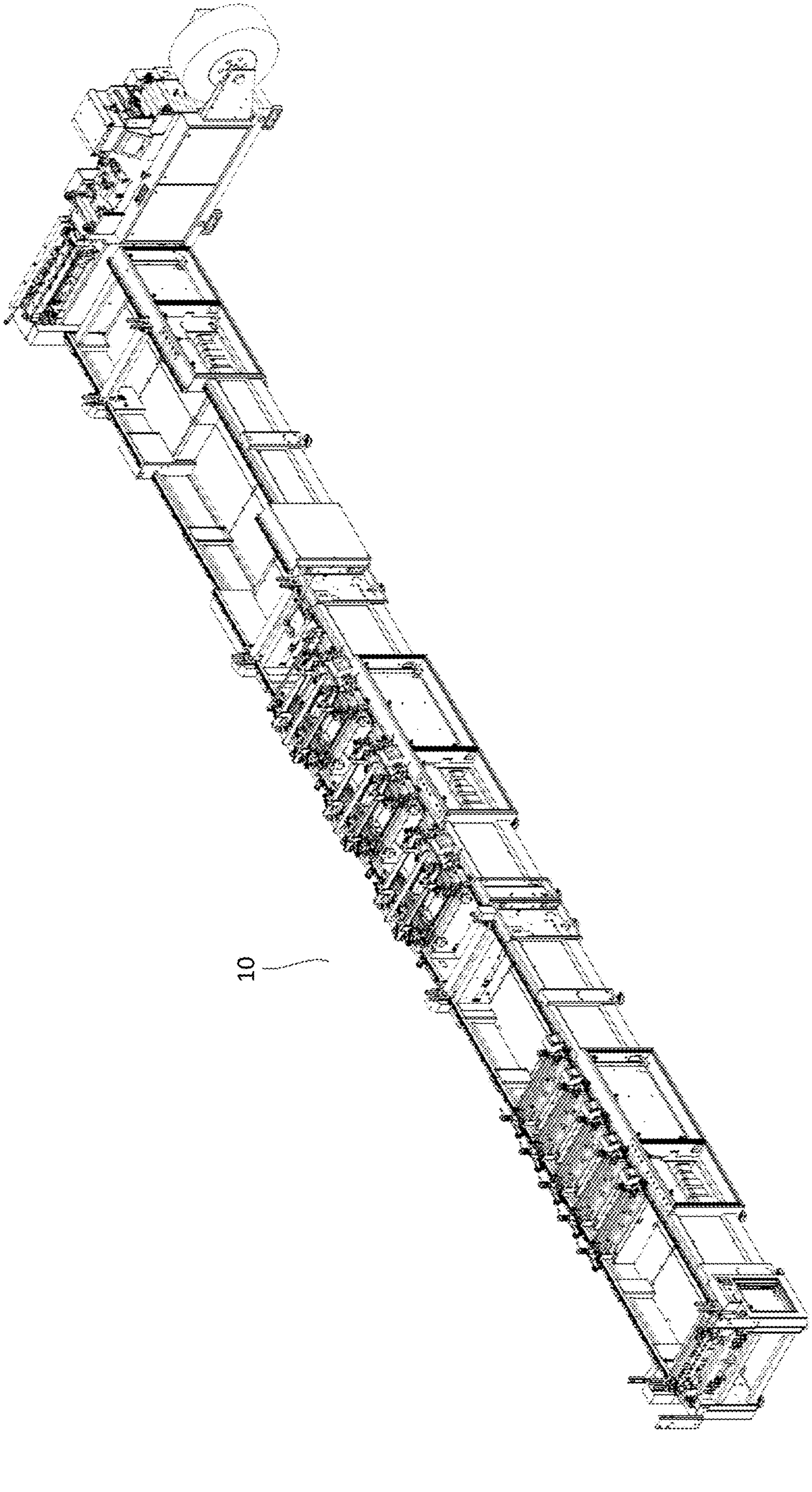
FIG. 1 shows a machine for manufacturing plastic film based bags and pouches in accordance with the present invention where the plastic film is in horizontal position.
Figure 2:
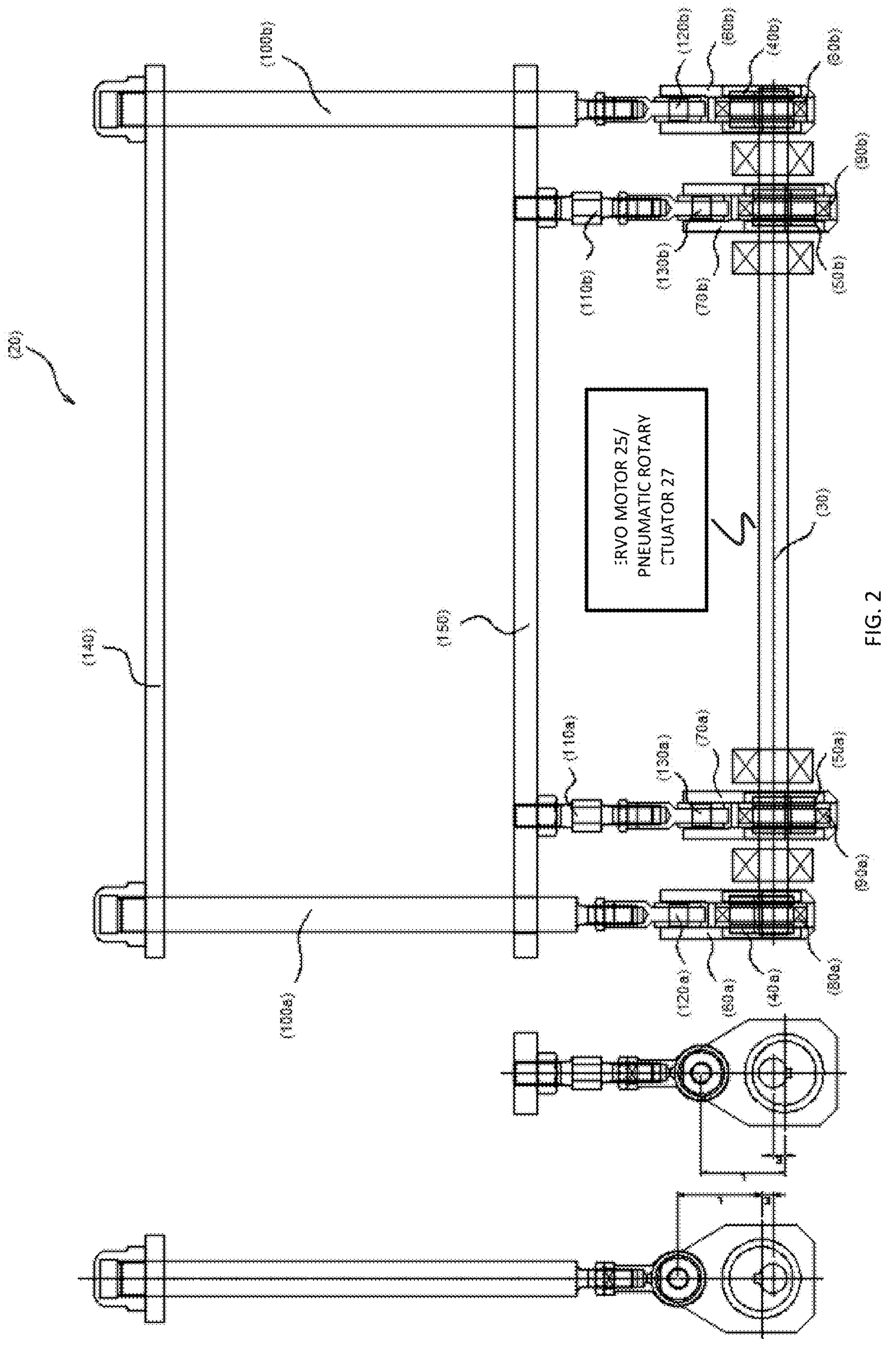
FIG. 2 shows main components of the multi-purpose sealing module for the machine in FIG. 1.

The present invention discloses a multi-purpose sealing module (20) shown in FIG. 2 for a machine (10) shown in FIG. 1 to manufacture heat-sealed plastic film based bags and pouches. In the said module (20), a common drive shaft (30) is driven by a servo motor 25. The common drive shaft (30) has a keyways on it. An upper seal beam (140) and a lower seal beam (150) are parts of the said module (20) and linearly move towards or away from each other in a controlled manner permitting desired and precise gaps in between sealing jaws (not shown) mounted on each of the two seal beams (140, 150). The plastic film is conventionally transported to the said gap for heat-sealing and after heat-sealing, transported further.

The upper seal beam (140) is rigidly connected with linear guide rods (100*a*, 100*b*) at both the ends. Conventionally, at such connection, a spring or a resilient coupling is used; however, the present invention, instead, has a rigid connection thereat. The said linear guide rods (100*a*, 100*b*) pass through holes in the lower seal beam (150) to guide movement of the lower seal beam (150).

The upper seal beam (140) and the lower seal beam (150) move linearly towards or away from each other. Such linear movement results from conversion of angular movement of the common drive shaft (30) into the said linear movement using crank and crank arm arrangements at four places: two for the upper seal beam (140) and two for the lower seal beam (150).

The servo motor driven common drive shaft (30) has keyed connections with two eccentric cams (40*a*, 40*b*) for the upper seal beam (140) and two eccentric cams (50*a*, 50*b*) for the lower seal beam (150). The eccentricity of the eccentric cams (40*a*, 40*b*) for the upper seal beam (140) is equal to and in opposite direction from the eccentricity of the eccentric cams (50*a*, 50*b*) for the lower seal beam (150).

For each of the four eccentric cams, there is a crank arm. Thus, there are two crank arms (60*a*, 60*b*) for the eccentric cams (40*a*, 40*b*) for the upper seal beam (140) and likewise, there are two crank arms (70*a*, 70*b*) for the eccentric cams (50*a*, 50*b*) for the lower seal beam (150). The connection of each crank arm with its eccentric cam is through a bearing. Thus, connection of crank arm (60*a*) with eccentric cam (40*a*) is through bearing (80*a*) and connection of crank arm (60*b*) with eccentric cam (40*b*) is through bearing (80*b*) for the upper seal beam (140) and similarly, connection of crank arm (70*a*) with eccentric cam (50*a*) is through bearing (90*a*) and connection of crank arm (70*b*) with eccentric cam (50*b*) is through bearing (90*b*).

The servo motor (not shown) driven angular movement of the common drive shaft (30) which is in keyed connection with the eccentric cams will be converted into linear movement of the crank arms. Selectively, the said angular movement of the common drive shaft (30) can be less than 360 degree angular rotation or a full 360 degree rotation. It can be discerned that whatever the angular movement is selected, it will be in opposite direction for the eccentric cams (40*a*, 40*b*) for the upper seal beam (140) and the eccentric cams (50*a*, 50*b*) for the lower seal beam (150).

The crank arms (60*a*, 60*b*) for the upper seal beam (140) are connected to the linear guide rods (100*a*, 100*b*) through bearings (120*a*, 120*b*) and the crank arms (70*a*, 70*b*) for the lower seal beam (150) are connected to connecting rods (110*a*, 110*b*) which are rigidly connected to the lower seal beam (150).

Therefore, angular movement of the common drive shaft (300 gives simultaneous linear movement in opposite directions to the upper seal beam (140) and the lower seal beam (150). The gap between the sealing jaw (not shown) connected to the upper seal beam (140) and the sealing jaw (not shown) connected to the lower seal beam (150) is thus controlled. Seal time and seal pressure of sealing of the plastic film based bags and pouches; and angular movement of the common drive shaft (30) are controlled by a programmable controller. For different thicknesses of the plastic film or for different materials of the plastic film, suitable seal time, seal pressure, and angular movement of the common drive shaft (30) data available to the machine operator can be selected using the controller.

The common drive shaft (30) can be driven by pneumatic rotary actuators 27 instead of servo motor 25. The common drive shaft (30) can be connected with eccentric cams (40*a*, 40*b*) and eccentric cams (50*a*, 50*b*) using clamping bushes (not shown) instead of the keyed connection described above in which case, the common drive shaft (30) need not have a keyways on it.

It would be evident to a person skilled in the art that the present invention is applicable equally to a machine wherein the plastic film is transported vertically as opposed to horizontally. In other words, the same inventive concept disclosed herein can be used in a machine to manufacture plastic film based bags and pouches when the plastic film is fed vertically. In such machines, instead of upper and lower beams, front and rear beams would be used while retaining the concept of converting angular movement of a common drive shaft into linear movement using crank and crank arm arrangements at four places: two for the front seal beam and two for the rear seal beam.

Figure 3:
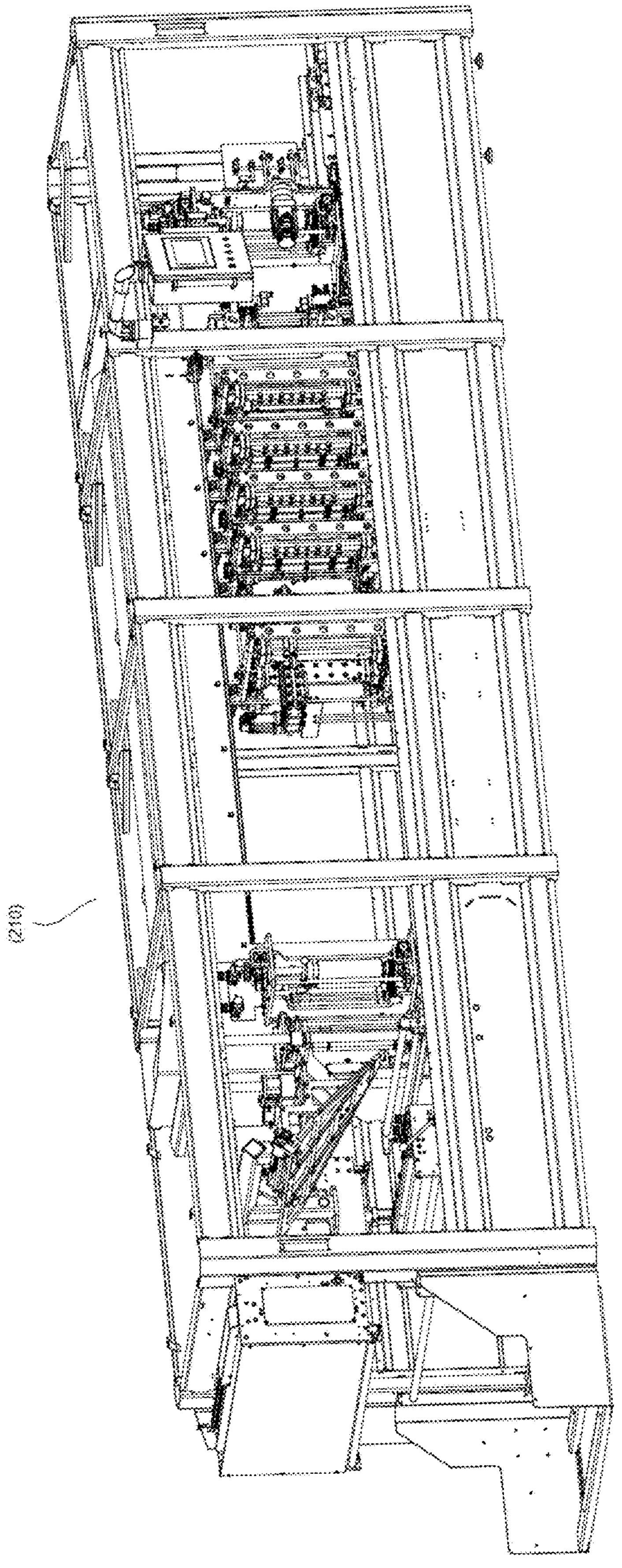
FIG. 3 shows a machine for manufacturing plastic film based bags and pouches in accordance with the present invention where the plastic film is in vertical position.
Figure 4:
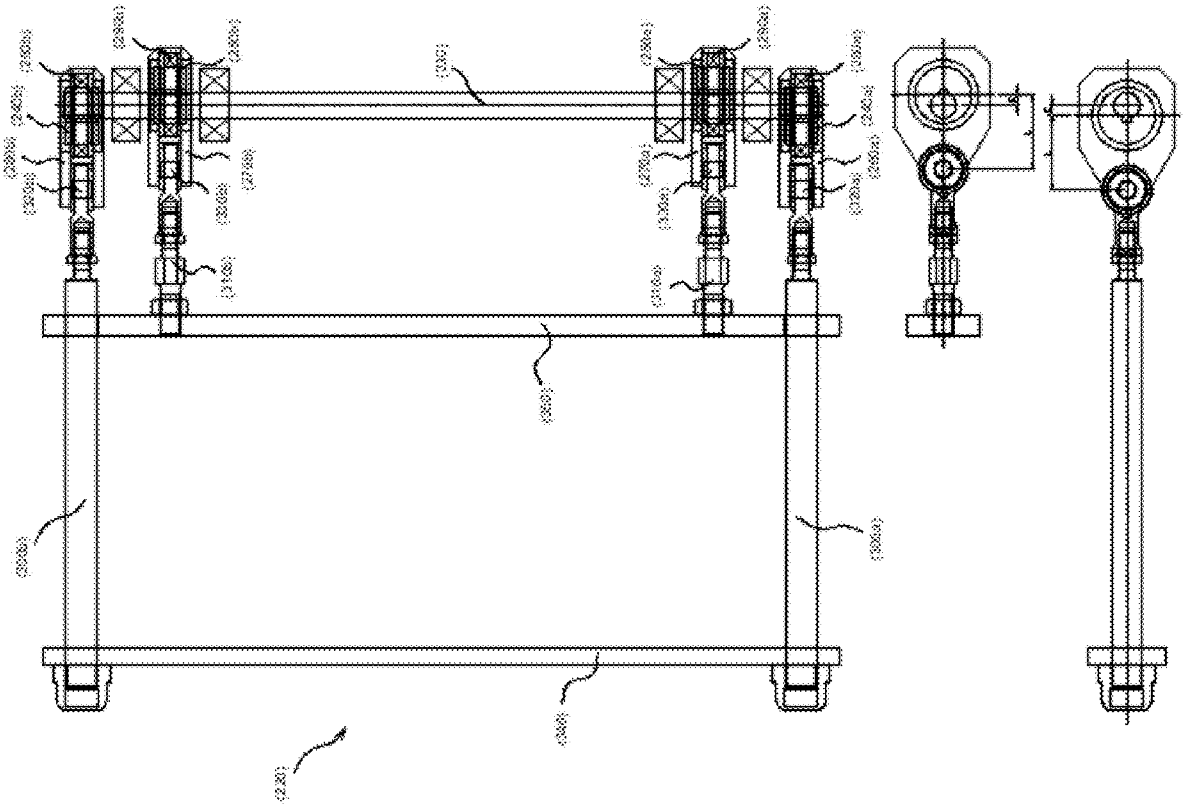
FIG. 4 shows main components of the multi-purpose sealing module for the machine in FIG. 3.

The present invention discloses a multi-purpose sealing module (220) shown in FIG. 4 for a machine (210) shown in FIG. 3 to manufacture heat-sealed plastic film based bags and pouches. In the said module (220), a common drive shaft (230) is driven by a servo motor (not shown). The common drive shaft (230) has a key throughout its length. An front seal beam (340) and a rear seal beam (350) are parts of the said module (220) and linearly move towards or away from each other in a controlled manner permitting desired and precise gaps in between sealing jaws (not shown) mounted on each of the two seal beams (340, 350). The plastic film is conventionally transported to the said gap for heat-sealing and after heat-sealing, transported further.

The front seal beam (340) is rigidly connected with linear guide rods (300*a*, 300*b*) at both the ends. Conventionally, at such connection, a spring or a resilient coupling is used; however, the present invention, instead, has a rigid connection thereat. The said linear guide rods (300*a*, 300*b*) pass through holes in the rear seal beam (350) to guide movement of the rear seal beam (350).

The front seal beam (340) and the rear seal beam (350) move linearly towards or away from each other. Such linear movement results from conversion of angular movement of the common drive shaft (230) into the said linear movement using crank and crank arm arrangements at four places: two for the front seal beam (340) and two for the rear seal beam (350).

The servo motor driven common drive shaft (230) has keyed connections with two eccentric cams (240*a*, 240*b*) for the front seal beam (340) and two eccentric cams (250*a*, 250*b*) for the rear seal beam (350). The eccentricity of the eccentric cams (240*a*, 240*b*) for the front seal beam (340) is equal to and in opposite direction from the eccentricity of the eccentric cams (250*a*, 250*b*) for the rear seal beam (350).

For each of the four eccentric cams, there is a crank arm. Thus, there are two crank arms (260*a*, 260*b*) for the eccentric cams (240*a*, 240*b*) for the front seal beam (340) and likewise, there are two crank arms (270*a*, 270*b*) for the eccentric cams (250*a*, 250*b*) for the rear seal beam (350). The connection of each crank arm with its eccentric cam is through a bearing. Thus, connection of crank arm (260*a*) with eccentric cam (240*a*) is through bearing (280*a*) and connection of crank arm (260*b*) with eccentric cam (240*b*) is through bearing (280*b*) for the front seal beam (340) and similarly, connection of crank arm (270*a*) with eccentric cam (250*a*) is through bearing (290*a*) and connection of crank arm (270*b*) with eccentric cam (250*b*) is through bearing (290*b*).

The servo motor (not shown) driven angular movement of the common drive shaft (230) which is in keyed connection with the eccentric cams will be converted into linear movement of the crank arms. Selectively, the said angular movement of the common drive shaft (230) can be less than 360 degree angular rotation or a full 360 degree rotation. It can be discerned that whatever the angular movement is selected, it will be in opposite direction for the eccentric cams (240*a*, 240*b*) for the front seal beam (340) and the eccentric cams (250*a*, 250*b*) for the rear seal beam (350).

The crank arms (260*a*, 260*b*) for the front seal beam (340) are connected to the linear guide rods (300*a*, 300*b*) through bearings (320*a*, 320*b*) and the crank arms (270*a*, 270*b*) for the rear seal beam (350) are connected to connecting rods (310*a*, 310*b*) which are rigidly connected to the rear seal beam (350).

Therefore, angular movement of the common drive shaft (230) gives simultaneous linear movement in opposite directions to the front seal beam (340) and the rear seal beam (350). The gap between the sealing jaw (not shown) connected to the front seal beam (340) and the sealing jaw (not shown) connected to the rear seal beam (350) is thus controlled. Seal time and seal pressure of sealing of the plastic film based bags and pouches; and angular movement of the common drive shaft (230) are controlled by a programmable controller. For different thicknesses of the plastic film or for different materials of the plastic film, suitable seal time, seal pressure, and angular movement of the common drive shaft (230) data available to the machine operator can be selected using the controller.

The common drive shaft (230) can be driven by pneumatic rotary actuators (not shown) instead of servo motor (not shown). The common drive shaft (230) can be connected with eccentric cams (240*a*, 240*b*) and eccentric cams (250*a*, 250*b*) using clamping bushes (not shown) instead of the keyed connection described above in which case, the common drive shaft (230) need not have a keyways on it.

BEST METHOD OF PERFORMING THE INVENTION

The best method of performing the present invention is with the multi-purpose sealing module (20) shown in FIG. 2 for a machine (10) shown in FIG. 1.

Figure 5:
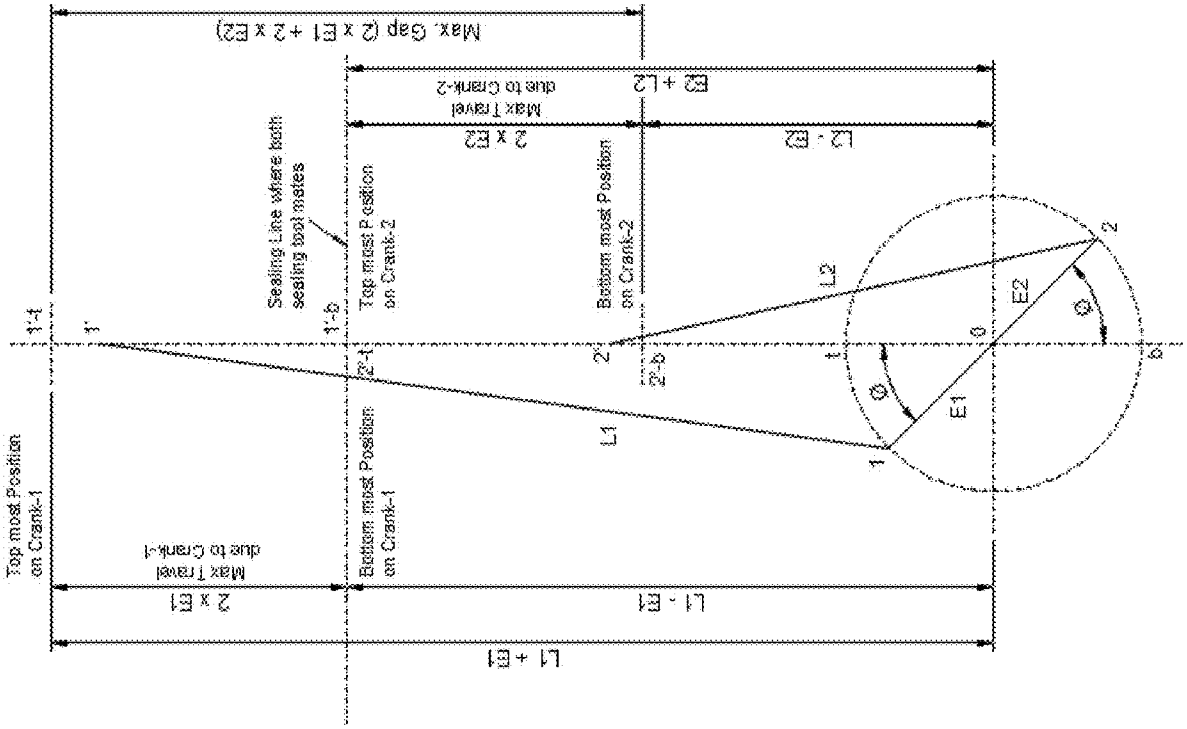
FIG. 5 shows linear movement of crank arms in relation to angular movement of eccentric cams of the multi-purpose sealing modules shown in FIGS. 2 and 4.
Figure 6:
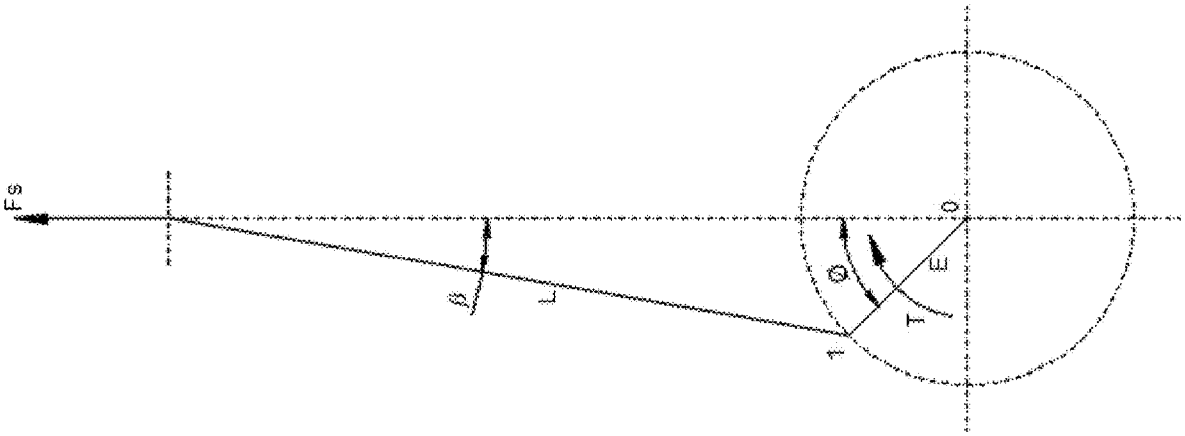
FIG. 6 shows calculation of force generated at the end of crank arms in multi-purpose sealing module due to applied torque on common drive shaft with reference to angular movement of the common drive shaft.

Referring to FIG. 5 which shows linear movement of crank arms (60*a*, 60*b*) and crank arms (70*a*, 70*b*) in relation to angular movement of eccentric cams (40*a*, 40*b*) and eccentric cams (50*a*, 50*b*) of the multi-purpose sealing module (20) shown in FIG. 2. As a person skilled in the art will readily understand, what is explained in FIG. 5 is applicable also to linear movement of crank arms (260*a*, 260*b*) and crank arms (270*a*, 270*b*) in relation to angular movement of eccentric cams (240*a*, 240*b*) and eccentric cams (250*a*, 250*b*) of the multi-purpose sealing module (220) shown in FIG. 4.

In FIG. 5, E1 represents the eccentricity between the common drive shaft (30) and the eccentric cams (40*a*, 40*b*) and L1 represents the length of the crank arms (60*a*, 60*b*). Similarly, E2 represents the eccentricity between the common drive shaft (30) and the eccentric cams (50*a*, 50*b*) and L2 represents the length of the crank arms (70*a*, 70*b*). Angular movement of the common drive shaft (30) is represented by Ø, referred to as the crank angle.

At crank angle Ø=0 degree, the upper seal beam (140) will be at its topmost position (1'–t) as shown in FIG. 5 and the lower seal beam (150) will be at its bottommost position (2'–*b*). This can be termed as maximum gap position or home position. At crank angle Ø=180 degrees, upper seal beam (140) will be at its bottommost position (1'–*b*) and lower seal beam (150) will be at its topmost position (2'–t). This can be termed as no gap position or sealing position. 1' and 2' are the intermediate positions of the upper seal beam (140) and the lower seal beam (150) respectively for angular movement Ø degree of the eccentric cams (40*a*, 40*b*) and the eccentric cams (50*a*, 50*b*) mounted on the common drive shaft (30). Distance between 1' and 2' is the live gap between the upper seal beam (140) and the lower sealing beam (150) for particular crank angle Ø.

Linear downward movement of the upper seal beam (140) in reference to crank angle Ø derives from following equation, $$E1\times(1-\mathrm{COS}\phi)+(L1\times(1-\mathrm{COS}(\mathrm{SIN}-1(E1\times\mathrm{SIN}\phi/L1))))$$

Linear upward movement of the lower sealing beam (150) in reference to crank angle Ø derives from following equation, $$E2\times(1-\mathrm{COS}\phi)+(L2\times\mathrm{COS}(\mathrm{SIN}-1(E2\times\mathrm{SIN}\phi/L2))-1)$$

As shown in FIG. 8, force is generated at the end of crank arms (60*a*, 60*b*) and crank arms (70*a*, 70*b*) in multi-purpose sealing module (20) due to applied torque on the common drive shaft (30) with reference to eccentric cams (40*a*, 40*b*) and eccentric cams (50*a*, 50*b*) and angular movement Ø. This value corresponds to the capability of the sealing force generated at particular angular movement Ø.

Calculation of force generated the end of the end of crank arms (60*a*, 60*b*) and crank arms (70*a*, 70*b*) with reference to the various crank angles Ø derives from following equation, $$T/(E\times\mathrm{COS}\phi+L\times\mathrm{COS}\beta)/\mathrm{TAN}\beta$$

Where, T=Torque applied by Drive Shaft; and
β=Angle of Crank Rod with motion line Crank angle Ø from the required Gap between the upper seal beam (140) and the lower seal beam (150) in the multi-purpose sealing module (20) can be calculated.

For processing different types of plastic films, a Gap or the opening between the upper seal beam (140) and the lower seal beam (150) may be required to be set in the multi-purpose sealing module (20). For heat sensitive films, gap requirement is higher to keep the heated seal beams away from the plastic film during non-sealing durations. Narrow Gap opening feature makes the multi-purpose sealing module (20) suitable to be operated at a high speed.

Calculation of Crank Degree Ø from the required Gap G as input derives from the following equation, $$\mathrm{COS}^{-1}(1-G/2/E)$$

Seal time and seal pressure of sealing of plastic film based bags and pouches; and angular movement of the drive shaft (30) are controlled by a programmable controller (not shown).

Example 1

In Example 1, the upper Seal beam (140) linear movement and lower seal beam (150) linear movement against each degree of angular movement Ø of the eccentric cams (40*a*, 40*b*) with 10 mm of eccentricity values for E1 and E2 and 72 mm as lengths L1 and L2 of crank arms (60*a*, 60*b*) are considered. Linear movements are tabulated in the attached Table-1 (for 0 to 180 degree) and Table-2 (for 180 to 360 degree).

TABLE 1

| Crank Angle ϕ | Top Sealer Down by 1' − t > 1' | Bottom Sealer Up by 2' − b > 2' | Gap |
|---|---|---|---|
| 0 | 0.0000 | 0.0000 | 40.000 |
| 1 | 0.0017 | 0.0013 | 39.997 |
| 2 | 0.0069 | 0.0052 | 39.988 |
| 3 | 0.0156 | 0.0118 | 39.973 |
| 4 | 0.0277 | 0.0210 | 39.951 |
| 5 | 0.0433 | 0.0328 | 39.924 |
| 6 | 0.0624 | 0.0472 | 39.890 |
| 7 | 0.0849 | 0.0642 | 39.851 |
| 8 | 0.1108 | 0.0839 | 39.805 |
| 9 | 0.1401 | 0.1061 | 39.754 |
| 10 | 0.1729 | 0.1310 | 39.696 |
| 11 | 0.2090 | 0.1584 | 39.633 |
| 12 | 0.2485 | 0.1885 | 39.563 |
| 13 | 0.2914 | 0.2211 | 39.487 |
| 14 | 0.3377 | 0.2564 | 39.406 |
| 15 | 0.3873 | 0.2942 | 39.319 |
| 16 | 0.4402 | 0.3346 | 39.225 |
| 17 | 0.4963 | 0.3776 | 39.126 |
| 18 | 0.5558 | 0.4231 | 39.021 |
| 19 | 0.6185 | 0.4712 | 38.910 |
| 20 | 0.6844 | 0.5218 | 38.794 |
| 21 | 0.7534 | 0.5750 | 38.672 |
| 22 | 0.8257 | 0.6306 | 38.544 |
| 23 | 0.9011 | 0.6889 | 38.410 |
| 24 | 0.9795 | 0.7496 | 38.271 |
| 25 | 1.0611 | 0.8128 | 38.126 |
| 26 | 1.1456 | 0.8785 | 37.976 |
| 27 | 1.2332 | 0.9467 | 37.820 |
| 28 | 1.3237 | 1.0173 | 37.659 |
| 29 | 1.4172 | 1.0904 | 37.492 |
| 30 | 1.5136 | 1.1659 | 37.321 |
| 31 | 1.6128 | 1.2439 | 37.143 |
| 32 | 1.7148 | 1.3242 | 36.961 |
| 33 | 1.8196 | 1.4070 | 36.773 |
| 34 | 1.9271 | 1.4921 | 36.581 |
| 35 | 2.0373 | 1.5797 | 36.383 |
| 36 | 2.1502 | 1.6695 | 36.180 |
| 37 | 2.2656 | 1.7617 | 35.973 |
| 38 | 2.3836 | 1.8562 | 35.760 |
| 39 | 2.5041 | 1.9530 | 35.543 |
| 40 | 2.6271 | 2.0521 | 35.321 |

TABLE 1-continued

| Crank Angle ϕ | Top Sealer Down by 1' − t > 1' | Bottom Sealer Up by 2' − b > 2' | Gap |
|---|---|---|---|
| 41 | 2.7524 | 2.1534 | 35.094 |
| 42 | 2.8802 | 2.2569 | 34.863 |
| 43 | 3.0102 | 2.3627 | 34.627 |
| 44 | 3.1425 | 2.4707 | 34.387 |
| 45 | 3.2770 | 2.5809 | 34.142 |
| 46 | 3.4137 | 2.6932 | 33.893 |
| 47 | 3.5524 | 2.8076 | 33.640 |
| 48 | 3.6932 | 2.9242 | 33.383 |
| 49 | 3.8360 | 3.0428 | 33.121 |
| 50 | 3.9808 | 3.1634 | 32.856 |
| 51 | 4.1274 | 3.2862 | 32.586 |
| 52 | 4.2759 | 3.4109 | 32.313 |
| 53 | 4.4262 | 3.5375 | 32.036 |
| 54 | 4.5781 | 3.6662 | 31.756 |
| 55 | 4.7317 | 3.7967 | 31.472 |
| 56 | 4.8870 | 3.9292 | 31.184 |
| 57 | 5.0437 | 4.0635 | 30.893 |
| 58 | 5.2020 | 4.1996 | 30.598 |
| 59 | 5.3617 | 4.3376 | 30.301 |
| 60 | 5.5227 | 4.4773 | 30.000 |
| 61 | 5.6851 | 4.6187 | 29.696 |
| 62 | 5.8487 | 4.7618 | 29.389 |
| 63 | 6.0135 | 4.9067 | 29.080 |
| 64 | 6.1795 | 5.0531 | 28.767 |
| 65 | 6.3465 | 5.2011 | 28.452 |
| 66 | 6.5145 | 5.3507 | 28.135 |
| 67 | 6.6835 | 5.5018 | 27.815 |
| 68 | 6.8534 | 5.6544 | 27.492 |
| 69 | 7.0241 | 5.8085 | 27.167 |
| 70 | 7.1956 | 5.9640 | 26.840 |
| 71 | 7.3679 | 6.1208 | 26.511 |
| 72 | 7.5407 | 6.2789 | 26.180 |
| 73 | 7.7142 | 6.4384 | 25.847 |
| 74 | 7.8882 | 6.5991 | 25.513 |
| 75 | 8.0627 | 6.7609 | 25.176 |
| 76 | 8.2376 | 6.9240 | 24.838 |
| 77 | 8.4128 | 7.0881 | 24.499 |
| 78 | 8.5884 | 7.2534 | 24.158 |
| 79 | 8.7642 | 7.4196 | 23.816 |
| 80 | 8.9402 | 7.5868 | 23.473 |
| 81 | 9.1163 | 7.7550 | 23.129 |
| 82 | 9.2925 | 7.9240 | 22.783 |
| 83 | 9.4687 | 8.0939 | 22.437 |
| 84 | 9.6449 | 8.2646 | 22.091 |
| 85 | 9.8209 | 8.4359 | 21.743 |
| 86 | 9.9968 | 8.6080 | 21.395 |
| 87 | 10.1725 | 8.7807 | 21.047 |
| 88 | 10.3480 | 8.9540 | 20.698 |
| 89 | 10.5231 | 9.1279 | 20.349 |
| 90 | 10.6978 | 9.3022 | 20.000 |
| 91 | 10.8721 | 9.4769 | 19.651 |
| 92 | 11.0460 | 9.6520 | 19.302 |
| 93 | 11.2193 | 9.8275 | 18.953 |
| 94 | 11.3920 | 10.0032 | 18.605 |
| 95 | 11.5641 | 10.1791 | 18.257 |
| 96 | 11.7354 | 10.3551 | 17.909 |
| 97 | 11.9061 | 10.5313 | 17.563 |
| 98 | 12.0760 | 10.7075 | 17.217 |
| 99 | 12.2450 | 10.8837 | 16.871 |
| 100 | 12.4132 | 11.0598 | 16.527 |
| 101 | 12.5804 | 11.2358 | 16.184 |
| 102 | 12.7466 | 11.4116 | 15.842 |
| 103 | 12.9119 | 11.5872 | 15.501 |
| 104 | 13.0760 | 11.7624 | 15.162 |
| 105 | 13.2391 | 11.9373 | 14.824 |
| 106 | 13.4009 | 12.1118 | 14.487 |
| 107 | 13.5616 | 12.2858 | 14.153 |
| 108 | 13.7211 | 12.4593 | 13.820 |
| 109 | 13.8792 | 12.6321 | 13.489 |
| 110 | 14.0360 | 12.8044 | 13.160 |
| 111 | 14.1915 | 12.9759 | 12.833 |
| 112 | 14.3456 | 13.1466 | 12.508 |
| 113 | 14.4982 | 13.3165 | 12.185 |
| 114 | 14.6493 | 13.4855 | 11.865 |
| 115 | 14.7989 | 13.6535 | 11.548 |
| 116 | 14.9469 | 13.8205 | 11.233 |

TABLE 1-continued

| Crank Angle ϕ | Top Sealer Down by 1' − t > 1' | Bottom Sealer Up by 2' − b > 2' | Gap |
|---|---|---|---|
| 117 | 15.0933 | 13.9865 | 10.920 |
| 118 | 15.2382 | 14.1513 | 10.611 |
| 119 | 15.3813 | 14.3149 | 10.304 |
| 120 | 15.5227 | 14.4773 | 10.000 |
| 121 | 15.6624 | 14.6383 | 9.699 |
| 122 | 15.8004 | 14.7980 | 9.402 |
| 123 | 15.9365 | 14.9563 | 9.107 |
| 124 | 16.0708 | 15.1130 | 8.816 |
| 125 | 16.2033 | 15.2683 | 8.528 |
| 126 | 16.3338 | 15.4219 | 8.244 |
| 127 | 16.4625 | 15.5738 | 7.964 |
| 128 | 16.5891 | 15.7241 | 7.687 |
| 129 | 16.7138 | 15.8726 | 7.414 |
| 130 | 16.8366 | 16.0192 | 7.144 |
| 131 | 16.9572 | 16.1640 | 6.879 |
| 132 | 17.0758 | 16.3068 | 6.617 |
| 133 | 17.1924 | 16.4476 | 6.360 |
| 134 | 17.3068 | 16.5863 | 6.107 |
| 135 | 17.4191 | 16.7230 | 5.858 |
| 136 | 17.5293 | 16.8575 | 5.613 |
| 137 | 17.6373 | 16.9898 | 5.373 |
| 138 | 17.7431 | 17.1198 | 5.137 |
| 139 | 17.8466 | 17.2476 | 4.906 |
| 140 | 17.9479 | 17.3729 | 4.679 |
| 141 | 18.0470 | 17.4959 | 4.457 |
| 142 | 18.1438 | 17.6164 | 4.240 |
| 143 | 18.2383 | 17.7344 | 4.027 |
| 144 | 18.3305 | 17.8498 | 3.820 |
| 145 | 18.4203 | 17.9627 | 3.617 |
| 146 | 18.5079 | 18.0729 | 3.419 |
| 147 | 18.5930 | 18.1804 | 3.227 |
| 148 | 18.6758 | 18.2852 | 3.039 |
| 149 | 18.7561 | 18.3872 | 2.857 |
| 150 | 18.8341 | 18.4864 | 2.679 |
| 151 | 18.9096 | 18.5828 | 2.508 |
| 152 | 18.9827 | 18.6763 | 2.341 |
| 153 | 19.0533 | 18.7668 | 2.180 |
| 154 | 19.1215 | 18.8544 | 2.024 |
| 155 | 19.1872 | 18.9389 | 1.874 |
| 156 | 19.2504 | 19.0205 | 1.729 |
| 157 | 19.3111 | 19.0989 | 1.590 |
| 158 | 19.3694 | 19.1743 | 1.456 |
| 159 | 19.4250 | 19.2466 | 1.328 |
| 160 | 19.4782 | 19.3156 | 1.206 |
| 161 | 19.5288 | 19.3815 | 1.090 |
| 162 | 19.5769 | 19.4442 | 0.979 |
| 163 | 19.6224 | 19.5037 | 0.874 |
| 164 | 19.6654 | 19.5598 | 0.775 |
| 165 | 19.7058 | 19.6127 | 0.681 |
| 166 | 19.7436 | 19.6623 | 0.594 |
| 167 | 19.7789 | 19.7086 | 0.513 |
| 168 | 19.8115 | 19.7515 | 0.437 |
| 169 | 19.8416 | 19.7910 | 0.367 |
| 170 | 19.8690 | 19.8271 | 0.304 |
| 171 | 19.8939 | 19.8599 | 0.246 |
| 172 | 19.9161 | 19.8892 | 0.195 |
| 173 | 19.9358 | 19.9151 | 0.149 |
| 174 | 19.9528 | 19.9376 | 0.110 |
| 175 | 19.9672 | 19.9567 | 0.076 |
| 176 | 19.9790 | 19.9723 | 0.049 |
| 177 | 19.9882 | 19.9844 | 0.027 |
| 178 | 19.9948 | 19.9931 | 0.012 |

TABLE 2

| Crank Angle ϕ | Top Sealer Down by 1' − t > 1' | Bottom Sealer Up by 2' − b > 2' | Gap |
|---|---|---|---|
| 180 | 20.0000 | 20.0000 | 0.000 |
| 181 | 19.9987 | 19.9983 | 0.003 |
| 182 | 19.9948 | 19.9931 | 0.012 |
| 183 | 19.9882 | 19.9844 | 0.027 |

TABLE 2-continued

| Crank Angle ϕ | Top Sealer Down by 1' − t > 1' | Bottom Sealer Up by 2' − b > 2' | Gap |
|---|---|---|---|
| 184 | 19.9790 | 19.9723 | 0.049 |
| 185 | 19.9672 | 19.9567 | 0.076 |
| 186 | 19.9528 | 19.9376 | 0.110 |
| 187 | 19.9358 | 19.9151 | 0.149 |
| 188 | 19.9161 | 19.8892 | 0.195 |
| 189 | 19.8939 | 19.8599 | 0.246 |
| 190 | 19.8690 | 19.8271 | 0.304 |
| 191 | 19.8416 | 19.7910 | 0.367 |
| 192 | 19.8115 | 19.7515 | 0.437 |
| 193 | 19.7789 | 19.7086 | 0.513 |
| 194 | 19.7436 | 19.6623 | 0.594 |
| 195 | 19.7058 | 19.6127 | 0.681 |
| 196 | 19.6654 | 19.5598 | 0.775 |
| 197 | 19.6224 | 19.5037 | 0.874 |
| 198 | 19.5769 | 19.4442 | 0.979 |
| 199 | 19.5288 | 19.3815 | 1.090 |
| 200 | 19.4782 | 19.3156 | 1.206 |
| 201 | 19.4250 | 19.2466 | 1.328 |
| 202 | 19.3694 | 19.1743 | 1.456 |
| 203 | 19.3111 | 19.0989 | 1.590 |
| 204 | 19.2504 | 19.0205 | 1.729 |
| 205 | 19.1872 | 18.9389 | 1.874 |
| 206 | 19.1215 | 18.8544 | 2.024 |
| 207 | 19.0533 | 18.7668 | 2.180 |
| 208 | 18.9827 | 18.6763 | 2.341 |
| 209 | 18.9096 | 18.5828 | 2.508 |
| 210 | 18.8341 | 18.4864 | 2.679 |
| 211 | 18.7561 | 18.3872 | 2.857 |
| 212 | 18.6758 | 18.2852 | 3.039 |
| 213 | 18.5930 | 18.1804 | 3.227 |
| 214 | 18.5079 | 18.0729 | 3.419 |
| 215 | 18.4203 | 17.9627 | 3.617 |
| 216 | 18.3305 | 17.8498 | 3.820 |
| 217 | 18.2383 | 17.7344 | 4.027 |
| 218 | 18.1438 | 17.6164 | 4.240 |
| 219 | 18.0470 | 17.4959 | 4.457 |
| 220 | 17.9479 | 17.3729 | 4.679 |
| 221 | 17.8466 | 17.2476 | 4.906 |
| 222 | 17.7431 | 17.1198 | 5.137 |
| 223 | 17.6373 | 16.9898 | 5.373 |
| 224 | 17.5293 | 16.8575 | 5.613 |
| 225 | 17.4191 | 16.7230 | 5.858 |
| 226 | 17.3068 | 16.5863 | 6.107 |
| 227 | 17.1924 | 16.4476 | 6.360 |
| 228 | 17.0758 | 16.3068 | 6.617 |
| 229 | 16.9572 | 16.1640 | 6.879 |
| 230 | 16.8366 | 16.0192 | 7.144 |
| 231 | 16.7138 | 15.8726 | 7.414 |
| 232 | 16.5891 | 15.7241 | 7.687 |
| 233 | 16.4625 | 15.5738 | 7.964 |
| 234 | 16.3338 | 15.4219 | 8.244 |
| 235 | 16.2033 | 15.2683 | 8.528 |
| 236 | 16.0708 | 15.1130 | 8.816 |
| 237 | 15.9365 | 14.9563 | 9.107 |
| 238 | 15.8004 | 14.7980 | 9.402 |
| 239 | 15.6624 | 14.6383 | 9.699 |
| 240 | 15.5227 | 14.4773 | 10.000 |
| 241 | 15.3813 | 14.3149 | 10.304 |
| 242 | 15.2382 | 14.1513 | 10.611 |
| 243 | 15.0933 | 13.9865 | 10.920 |
| 244 | 14.9469 | 13.8205 | 11.233 |
| 245 | 14.7989 | 13.6535 | 11.548 |
| 246 | 14.6493 | 13.4855 | 11.865 |
| 247 | 14.4982 | 13.3165 | 12.185 |
| 248 | 14.3456 | 13.1466 | 12.508 |
| 249 | 14.1915 | 12.9759 | 12.833 |
| 250 | 14.0360 | 12.8044 | 13.160 |
| 251 | 13.8792 | 12.6321 | 13.489 |
| 252 | 13.7211 | 12.4593 | 13.820 |
| 253 | 13.5616 | 12.2858 | 14.153 |
| 254 | 13.4009 | 12.1118 | 14.487 |
| 255 | 13.2391 | 11.9373 | 14.824 |
| 256 | 13.0760 | 11.7624 | 15.162 |
| 257 | 12.9119 | 11.5872 | 15.501 |
| 258 | 12.7466 | 11.4116 | 15.842 |
| 259 | 12.5804 | 11.2358 | 16.184 |

TABLE 2-continued

| Crank Angle ϕ | Top Sealer Down by 1' − t > 1' | Bottom Sealer Up by 2' − b > 2' | Gap |
|---|---|---|---|
| 260 | 12.4132 | 11.0598 | 16.527 |
| 261 | 12.2450 | 10.8837 | 16.871 |
| 262 | 12.0760 | 10.7075 | 17.217 |
| 263 | 11.9061 | 10.5313 | 17.563 |
| 264 | 11.7354 | 10.3551 | 17.909 |
| 265 | 11.5641 | 10.1791 | 18.257 |
| 266 | 11.3920 | 10.0032 | 18.605 |
| 267 | 11.2193 | 9.8275 | 18.953 |
| 268 | 11.0460 | 9.6520 | 19.302 |
| 269 | 10.8721 | 9.4769 | 19.651 |
| 270 | 10.6978 | 9.3022 | 20.000 |
| 271 | 10.5231 | 9.1279 | 20.349 |
| 272 | 10.3480 | 8.9540 | 20.698 |
| 273 | 10.1725 | 8.7807 | 21.047 |
| 274 | 9.9968 | 8.6080 | 21.395 |
| 275 | 9.8209 | 8.4359 | 21.743 |
| 276 | 9.6449 | 8.2646 | 22.091 |
| 277 | 9.4687 | 8.0939 | 22.437 |
| 278 | 9.2925 | 7.9240 | 22.783 |
| 279 | 9.1163 | 7.7550 | 23.129 |
| 280 | 8.9402 | 7.5868 | 23.473 |
| 281 | 8.7642 | 7.4196 | 23.816 |
| 282 | 8.5884 | 7.2534 | 24.158 |
| 283 | 8.4128 | 7.0881 | 24.499 |
| 284 | 8.2376 | 6.9240 | 24.838 |
| 285 | 8.0627 | 6.7609 | 25.176 |
| 286 | 7.8882 | 6.5991 | 25.513 |
| 287 | 7.7142 | 6.4384 | 25.847 |
| 288 | 7.5407 | 6.2789 | 26.180 |
| 289 | 7.3679 | 6.1208 | 26.511 |
| 290 | 7.1956 | 5.9640 | 26.840 |
| 291 | 7.0241 | 5.8085 | 27.167 |
| 292 | 6.8534 | 5.6544 | 27.492 |
| 293 | 6.6835 | 5.5018 | 27.815 |
| 294 | 6.5145 | 5.3507 | 28.135 |
| 295 | 6.3465 | 5.2011 | 28.452 |
| 296 | 6.1795 | 5.0531 | 28.767 |
| 297 | 6.0135 | 4.9067 | 29.080 |
| 298 | 5.8487 | 4.7618 | 29.389 |
| 299 | 5.6851 | 4.6187 | 29.696 |
| 300 | 5.5227 | 4.4773 | 30.000 |
| 301 | 5.3617 | 4.3376 | 30.301 |
| 302 | 5.2020 | 4.1996 | 30.598 |
| 303 | 5.0437 | 4.0635 | 30.893 |
| 304 | 4.8870 | 3.9292 | 31.184 |
| 305 | 4.7317 | 3.7967 | 31.472 |
| 306 | 4.5781 | 3.6662 | 31.756 |
| 307 | 4.4262 | 3.5375 | 32.036 |
| 308 | 4.2759 | 3.4109 | 32.313 |
| 309 | 4.1274 | 3.2862 | 32.586 |
| 310 | 3.9808 | 3.1634 | 32.856 |
| 311 | 3.8360 | 3.0428 | 33.121 |
| 312 | 3.6932 | 2.9242 | 33.383 |
| 313 | 3.5524 | 2.8076 | 33.640 |
| 314 | 3.4137 | 2.6932 | 33.893 |
| 315 | 3.2770 | 2.5809 | 34.142 |
| 316 | 3.1425 | 2.4707 | 34.387 |
| 317 | 3.0102 | 2.3627 | 34.627 |
| 318 | 2.8802 | 2.2569 | 34.863 |
| 319 | 2.7524 | 2.1534 | 35.094 |
| 320 | 2.6271 | 2.0521 | 35.321 |
| 321 | 2.5041 | 1.9530 | 35.543 |
| 322 | 2.3836 | 1.8562 | 35.760 |
| 323 | 2.2656 | 1.7617 | 35.973 |
| 324 | 2.1502 | 1.6695 | 36.180 |
| 325 | 2.0373 | 1.5797 | 36.383 |
| 326 | 1.9271 | 1.4921 | 36.581 |
| 327 | 1.8196 | 1.4070 | 36.773 |
| 328 | 1.7148 | 1.3242 | 36.961 |
| 329 | 1.6128 | 1.2439 | 37.143 |
| 330 | 1.5136 | 1.1659 | 37.321 |
| 331 | 1.4172 | 1.0904 | 37.492 |
| 332 | 1.3237 | 1.0173 | 37.659 |
| 333 | 1.2332 | 0.9467 | 37.820 |
| 334 | 1.1456 | 0.8785 | 37.976 |
| 335 | 1.0611 | 0.8128 | 38.126 |

TABLE 2-continued

| Crank Angle ϕ | Top Sealer Down by 1' − t > 1' | Bottom Sealer Up by 2' − b > 2' | Gap |
|---|---|---|---|
| 336 | 0.9795 | 0.7496 | 38.271 |
| 337 | 0.9011 | 0.6889 | 38.410 |
| 338 | 0.8257 | 0.6306 | 38.544 |
| 339 | 0.7534 | 0.5750 | 38.672 |
| 340 | 0.6844 | 0.5218 | 38.794 |
| 341 | 0.6185 | 0.4712 | 38.910 |
| 342 | 0.5558 | 0.4231 | 39.021 |
| 343 | 0.4963 | 0.3776 | 39.126 |
| 344 | 0.4402 | 0.3346 | 39.225 |
| 345 | 0.3873 | 0.2942 | 39.319 |
| 346 | 0.3377 | 0.2564 | 39.406 |
| 347 | 0.2914 | 0.2211 | 39.487 |
| 348 | 0.2485 | 0.1885 | 39.563 |
| 349 | 0.2090 | 0.1584 | 39.633 |
| 350 | 0.1729 | 0.1310 | 39.696 |
| 351 | 0.1401 | 0.1061 | 39.754 |
| 352 | 0.1108 | 0.0839 | 39.805 |
| 353 | 0.0849 | 0.0642 | 39.851 |
| 354 | 0.0624 | 0.0472 | 39.890 |
| 355 | 0.0433 | 0.0328 | 39.924 |
| 356 | 0.0277 | 0.0210 | 39.951 |
| 357 | 0.0156 | 0.0118 | 39.973 |
| 358 | 0.0069 | 0.0052 | 39.988 |
| 359 | 0.0017 | 0.0013 | 39.997 |
| 360 | 0.0000 | 0.0000 | 40.000 |

This concept is applied in multi-purpose sealing module (20) where very small movements at the ends of stroke can be used for its low impact and a gentle touch characteristic for sealing the plastic films without damage or deterioration, even while the common drive shaft (30) is having same angular speed throughout the cycle.

Example 2

In Example 2, torque considered is 50 Nm, eccentricity value (E) considered is 10 mm, length of crank arms (60*a*, 60*b*) and crank arms (70*a*, 70*b*) considered is 72 mm. Force generated at the end of crank arms (60*a*, 60*b*) and crank arms (70*a*, 70*b*) against each degree of angular movement Ø of the eccentric cams (40*a*, 40*b*) and eccentric cams (50*a*, 50*b*) due to torque applied on the common drive shaft (30) are tabulated in Table-3.

TABLE 3

| Crank Degree | Force (N) |
|---|---|
| 0.0001 | 2 51 54 24 466 |
| 1 | 2 51 560 |
| 2 | 1 25 806 |
| 3 | 83 900 |
| 4 | 62 955 |
| 5 | 50 395 |
| 6 | 42 028 |
| 7 | 36 056 |
| 8 | 31 582 |
| 9 | 28 106 |
| 10 | 25 328 |
| 11 | 23 059 |
| 12 | 21 171 |
| 13 | 19 576 |
| 14 | 18 212 |
| 15 | 17 032 |
| 16 | 16 002 |
| 17 | 15 095 |
| 18 | 14 291 |
| 19 | 13 573 |
| 20 | 12 930 |
| 21 | 12 349 |

TABLE 3-continued

| Crank Degree | Force (N) |
|---|---|
| 22 | 11 823 |
| 23 | 11 344 |
| 24 | 10 907 |
| 25 | 10 506 |
| 26 | 10 138 |
| 27 | 9 798 |
| 28 | 9 485 |
| 29 | 9 194 |
| 30 | 8 924 |
| 31 | 8 673 |
| 32 | 8 439 |
| 33 | 8 220 |
| 34 | 8 016 |
| 35 | 7 824 |
| 36 | 7 645 |
| 37 | 7 476 |
| 38 | 7 318 |
| 39 | 7 168 |
| 40 | 7 028 |
| 41 | 6 895 |
| 42 | 6 771 |
| 43 | 6 653 |
| 44 | 6 541 |
| 45 | 6 436 |
| 46 | 6 336 |
| 47 | 6 242 |
| 48 | 6 153 |
| 49 | 6 069 |
| 50 | 5 989 |
| 51 | 5 914 |
| 52 | 5 842 |
| 53 | 5 775 |
| 54 | 5 711 |
| 55 | 5 651 |
| 56 | 5 594 |
| 57 | 5 540 |
| 58 | 5 489 |
| 59 | 5 441 |
| 60 | 5 396 |
| 61 | 5 354 |
| 62 | 5 314 |
| 63 | 5 276 |
| 64 | 5 241 |
| 65 | 5 209 |
| 66 | 5 178 |
| 67 | 5 150 |
| 68 | 5 124 |
| 69 | 5 100 |
| 70 | 5 078 |
| 71 | 5 057 |
| 72 | 5 039 |
| 73 | 5 023 |
| 74 | 5 008 |
| 75 | 4 995 |
| 76 | 4 984 |
| 77 | 4 975 |
| 78 | 4 967 |
| 79 | 4 961 |
| 80 | 4 956 |
| 81 | 4 954 |
| 82 | 4 952 |
| 83 | 4 953 |
| 84 | 4 955 |
| 85 | 4 958 |
| 86 | 4 964 |
| 87 | 4 970 |
| 88 | 4 979 |
| 89 | 4 989 |
| 90 | 5 000 |
| 91 | 5 013 |
| 92 | 5 028 |
| 93 | 5 044 |
| 94 | 5 062 |
| 95 | 5 081 |
| 96 | 5 102 |
| 97 | 5 125 |
| 98 | 5 150 |
| 99 | 5 176 |

TABLE 3-continued

| Crank Degree | Force (N) |
|---|---|
| 100 | 5 204 |
| 101 | 5 234 |
| 102 | 5 265 |
| 103 | 5 299 |
| 104 | 5 334 |
| 105 | 5 371 |
| 106 | 5 410 |
| 107 | 5 452 |
| 108 | 5 495 |
| 109 | 5 541 |
| 110 | 5 589 |
| 111 | 5 639 |
| 112 | 5 691 |
| 113 | 5 746 |
| 114 | 5 804 |
| 115 | 5 864 |
| 116 | 5 927 |
| 117 | 5 992 |
| 118 | 6 061 |
| 119 | 6 133 |
| 120 | 6 208 |
| 121 | 6 286 |
| 122 | 6 368 |
| 123 | 6 453 |
| 124 | 6 543 |
| 125 | 6 636 |
| 126 | 6 734 |
| 127 | 6 836 |
| 128 | 6 942 |
| 129 | 7 054 |
| 130 | 7 171 |
| 131 | 7 293 |
| 132 | 7 422 |
| 133 | 7 556 |
| 134 | 7 697 |
| 135 | 7 845 |
| 136 | 8 001 |
| 137 | 8 164 |
| 138 | 8 337 |
| 139 | 8 518 |
| 140 | 8 709 |
| 141 | 8 911 |
| 142 | 9 124 |
| 143 | 9 349 |
| 144 | 9 587 |
| 145 | 9 840 |
| 146 | 10 109 |
| 147 | 10 395 |
| 148 | 10 699 |
| 149 | 11 024 |
| 150 | 11 371 |
| 151 | 11 743 |
| 152 | 12 143 |
| 153 | 12 572 |
| 154 | 13 036 |
| 155 | 13 538 |
| 156 | 14 083 |
| 157 | 14 676 |
| 158 | 15 323 |
| 159 | 16 034 |
| 160 | 16 816 |
| 161 | 17 682 |
| 162 | 18 646 |
| 163 | 19 723 |
| 164 | 20 937 |
| 165 | 22 314 |
| 166 | 23 889 |
| 167 | 25 708 |
| 168 | 27 831 |
| 169 | 30 342 |
| 170 | 33 358 |
| 171 | 37 045 |
| 172 | 41 657 |
| 173 | 47 589 |
| 174 | 55 501 |
| 175 | 66 581 |
| 176 | 83 207 |
| 177 | 1 10 922 |
| 178 | 1 66 360 |
| 179 | 3 32 694 |
| 179.9999 | 3 32 68 51 714 |

This concept is applied in multi-purpose sealing module (20) where large amount of force at sealing beams can be generated and is utilized for sealing a variety of film thicknesses.

Example 3

In Example 3, the eccentricity value (E) considered is 10 mm for the eccentric cams (40*a*, 40*b*) the eccentric cams (50*a*, 50*b*). Maximum Gap value settable is (2xE1+2xE2). In this Example, Maximum Gap will be 40 mm against each Control Gap dimension as input value, the degree of angular movement Ø of the eccentric cams (40*a*, 40*b*) the eccentric cams (50*a*, 50*b*) is tabulated in Table-4.

TABLE 4

| Gap | Crank Degree |
|---|---|
| 0.00 | 0.0000 |
| 0.25 | 9.0687 |
| 0.50 | 12.8386 |
| 0.75 | 15.7405 |
| 1.00 | 18.1949 |
| 1.25 | 20.3641 |
| 1.50 | 22.3316 |
| 1.75 | 24.1468 |
| 2.00 | 25.8419 |
| 2.25 | 27.4392 |
| 2.50 | 28.9550 |
| 2.75 | 30.4015 |
| 3.00 | 31.7883 |
| 3.25 | 33.1229 |
| 3.50 | 34.4115 |
| 3.75 | 35.6591 |
| 4.00 | 36.8699 |
| 4.25 | 38.0475 |
| 4.50 | 39.1950 |
| 4.75 | 40.3149 |
| 5.00 | 41.4096 |
| 5.25 | 42.4811 |
| 5.50 | 43.5312 |
| 5.75 | 44.5613 |
| 6.00 | 45.5730 |
| 6.25 | 46.5675 |
| 6.50 | 47.5458 |
| 6.75 | 48.5092 |
| 7.00 | 49.4584 |
| 7.25 | 50.3943 |
| 7.50 | 51.3178 |
| 7.75 | 52.2295 |
| 8.00 | 53.1301 |
| 8.25 | 54.0202 |
| 8.50 | 54.9004 |
| 8.75 | 55.7711 |
| 9.00 | 56.6330 |
| 9.25 | 57.4864 |
| 9.50 | 58.3318 |
| 9.75 | 59.1695 |
| 10.00 | 60.0000 |
| 10.25 | 60.8236 |
| 10.50 | 61.6406 |
| 10.75 | 62.4515 |
| 11.00 | 63.2563 |
| 11.25 | 64.0555 |
| 11.50 | 64.8493 |
| 11.75 | 65.6380 |
| 12.00 | 66.4218 |
| 12.25 | 67.2010 |

TABLE 4-continued

| Gap | Crank Degree |
|---|---|
| 12.50 | 67.9757 |
| 12.75 | 68.7462 |
| 13.00 | 69.5127 |
| 13.25 | 70.2754 |
| 13.50 | 71.0344 |
| 13.75 | 71.7900 |
| 14.00 | 72.5424 |
| 14.25 | 73.2917 |
| 14.50 | 74.0380 |
| 14.75 | 74.7815 |
| 15.00 | 75.5225 |
| 15.25 | 76.2610 |
| 15.50 | 76.9971 |
| 15.75 | 77.7311 |
| 16.00 | 78.4630 |
| 16.25 | 79.1931 |
| 16.50 | 79.9213 |
| 16.75 | 80.6480 |
| 17.00 | 81.3731 |
| 17.25 | 82.0968 |
| 17.50 | 82.8192 |
| 17.75 | 83.5406 |
| 18.00 | 84.2608 |
| 18.25 | 84.9802 |
| 18.50 | 85.6988 |
| 18.75 | 86.4167 |
| 19.00 | 87.1340 |
| 19.25 | 87.8509 |
| 19.50 | 88.5675 |
| 19.75 | 89.2838 |
| 20.00 | 90.0000 |
| 20.25 | 90.7162 |
| 20.50 | 91.4325 |
| 20.75 | 92.1491 |
| 21.00 | 92.8660 |
| 21.25 | 93.5833 |
| 21.50 | 94.3012 |
| 21.75 | 95.0198 |
| 22.00 | 95.7392 |
| 22.25 | 96.4594 |
| 22.50 | 97.1808 |
| 22.75 | 97.9032 |
| 23.00 | 98.6269 |
| 23.25 | 99.3520 |
| 23.50 | 100.0787 |
| 23.75 | 100.8069 |
| 24.00 | 101.5370 |
| 24.25 | 102.2689 |
| 24.50 | 103.0029 |
| 24.75 | 103.7390 |
| 25.00 | 104.4775 |
| 25.25 | 105.2185 |
| 25.50 | 105.9620 |
| 25.75 | 106.7083 |
| 26.00 | 107.4576 |
| 26.25 | 108.2100 |
| 26.50 | 108.9656 |
| 26.75 | 109.7246 |
| 27.00 | 110.4873 |
| 27.25 | 111.2538 |
| 27.50 | 112.0243 |
| 27.75 | 112.7990 |
| 28.00 | 113.5782 |
| 28.25 | 114.3620 |
| 28.50 | 115.1507 |
| 28.75 | 115.9445 |
| 29.00 | 116.7437 |
| 29.25 | 117.5485 |
| 29.50 | 118.3594 |
| 29.75 | 119.1764 |
| 30.00 | 120.0000 |
| 30.25 | 120.8305 |
| 30.50 | 121.6682 |
| 30.75 | 122.5136 |
| 31.00 | 123.3670 |
| 31.25 | 124.2289 |
| 31.50 | 125.0996 |
| 31.75 | 125.9798 |

TABLE 4-continued

| Gap | Crank Degree |
|---|---|
| 32.00 | 126.8699 |
| 32.25 | 127.7705 |
| 32.50 | 128.6822 |
| 32.75 | 129.6057 |
| 33.00 | 130.5416 |
| 33.25 | 131.4908 |
| 33.50 | 132.4542 |
| 33.75 | 133.4325 |
| 34.00 | 134.4270 |
| 34.25 | 135.4387 |
| 34.50 | 136.4688 |
| 34.75 | 137.5189 |
| 35.00 | 138.5904 |
| 35.25 | 139.6851 |
| 35.50 | 140.8050 |
| 35.75 | 141.9525 |
| 36.00 | 143.1301 |
| 36.25 | 144.3409 |
| 36.50 | 145.5885 |
| 36.75 | 146.8771 |
| 37.00 | 148.2117 |
| 37.25 | 149.5985 |
| 37.50 | 151.0450 |
| 37.75 | 152.5608 |
| 38.00 | 154.1581 |
| 38.25 | 155.8532 |
| 38.50 | 157.6684 |
| 38.75 | 159.6359 |
| 39.00 | 161.8051 |
| 39.25 | 164.2595 |
| 39.50 | 167.1614 |
| 39.75 | 170.9313 |
| 40.00 | 180.0000 |

This concept is applied in multi-purpose sealing module (20) where controlled gap between the upper seal beam (140) and the lower seal beam (150) can be generated and utilized for sealing of a variety of plastic film thicknesses as per requirement.

The multi-purpose sealing module (20) utilizes a common crank and crank arm mechanism innovatively for generating high seal force for some applications; very slow motion at the end of stroke for gentle sealing touch while sealing, moving upper seal beam (140) and lower seal beam (150) simultaneously by a common drive shaft (30) making it a well-balanced system capable to run at high speeds using which controlled Gaps can be generated for sealing of a variety of plastic film thicknesses as per requirements.

The description with the appended drawings is not intended to represent the only forms that may be developed or utilized using the inventive concept disclosed. It is to be understood that the disclosed embodiments are exemplary of the disclosure that may be embodied in various and alternative forms. Therefore, specific structural and functional details disclosed herein are not to be interpreted as limiting, but merely as a representative for teaching one skilled in the art to variously employ the present invention.

We claim:

1. A multi-purpose sealing module (20) for a machine (10) to manufacture heat-sealed plastic film based bags and pouches, comprising a. a common drive shaft (30) driven by a servo motor or a pneumatic rotary actuator and in keyed connection with a first pair of eccentric cams (40 *a*, 40 *b*) and a second pair of eccentric cams (50 *a*, 50 *b*) such that eccentricity is equal and in opposite directions;

b. a first pair of crank arms (60 *a*, 60 *b*) connected to the first pair of eccentric cams (40 *a*, 40 *b*) though a first set of bearings (80 *a*, 80 *b*) and through a second set of bearings (120 *a*, 120 *b*) to linear guide rods (100 *a*, 100 *b*);

c. the linear guide rods (100 *a*, 100 *b*) in rigid connection with upper seal beam (140);

d. a second pair of crank arms (70 *a*, 70 *b*) connected to the second pair of eccentric cams (50 *a*, 50 *b*) though a third set of bearings (90 *a*, 90 *b*) and through a fourth set of bearings (130 *a*, 130 *b*) to connecting rods (110 *a*, 110 *b*);

e. the connecting rods (110 *a*, 110 *b*) in rigid connection with lower seal beam (150);

f. movement of the lower seal beam (150) guided by the linear guide rods (100 *a*, 100 *b*); and g. angular movement of the drive shaft (30) giving simultaneous linear movement in opposite directions to the upper seal beam (140) and the lower seal beam (150) controlling the gap between a sealing jaw connected to the upper seal beam (140) and a sealing jaw connected to the lower seal beam (150); and seal time and seal pressure of sealing of plastic film based bags and pouches; and angular movement of the drive shaft (30) controlled by a programmable controller.

2. The multi-purpose sealing module (20) as claimed in claim 1 wherein the common drive shaft (30) is driven by a pneumatic rotary actuator.

3. The multi-purpose sealing module (20) as claimed in claim 1 wherein the common drive shaft (30) is connected with the first pair of eccentric cams (40 *a*, 40 *b*) and the second pair of eccentric cams (50 *a*, 50 *b*) using clamping bushes.

4. A multi-purpose sealing module (220) for a machine (210) to manufacture heat-sealed plastic film based bags and pouches, comprising a. a common drive shaft (230) driven by a servo motor or a pneumatic rotary actuator and in keyed connection with a first pair of eccentric cams (240 *a*, 240 *b*) and a second pair of eccentric cams (250 *a*, 250 *b*) such that eccentricity is equal and in opposite directions;

b. a first set of crank arms (260 *a*, 260 *b*) connected to the first pair of eccentric cams (240 *a*, 240 *b*) though a first set of bearings (280 *a*, 280 *b*) and through a second set of bearings (320 *a*, 320 *b*) to linear guide rods (300 *a*, 300 *b*);

c. the linear guide rods (300 *a*, 300 *b*) in rigid connection with front seal beam (340);

d. a second set of crank arms (270 *a*, 270 *b*) connected to the second pair of eccentric cams (250 *a*, 250 *b*) though a third set of bearings (290 *a*, 290 *b*) and through a fourth set of bearings (330 *a*, 330 *b*) to connecting rods (310 *a*, 310 *b*);

e. the connecting rods (310 *a*, 310 *b*) in rigid connection with rear seal beam (350);

f. movement of the rear seal beam (350) guided by the linear guide rods (300 *a*, 300 *b*); and g. angular movement of the drive shaft (230) giving simultaneous linear movement in opposite directions to the front seal beam (340) and the rear seal beam (350) controlling the gap between a sealing jaw connected to the front seal beam (340) and a sealing jaw connected to the rear seal beam (350); and seal time and seal pressure of sealing of plastic film based bags and pouches; and angular movement of the drive shaft (230) controlled by a programmable controller.

5. The multi-purpose sealing module (220) as claimed in claim 4 wherein the common drive shaft (230) is driven by a pneumatic rotary actuator.

6. The multi-purpose sealing module (220) as claimed in claim 4 wherein the common drive shaft (230) is connected with the first pair of eccentric cams (240 *a*, 240 *b*) and the second pair of eccentric cams (250 *a*, 250 *b*) using clamping bushes.

* * * * *